United States Patent
Iida et al.

(10) Patent No.: US 12,281,730 B2
(45) Date of Patent: Apr. 22, 2025

(54) TUBE FITTING

(71) Applicant: NIPPON PILLAR PACKING CO., LTD., Osaka (JP)

(72) Inventors: Toshihide Iida, Osaka (JP); Kenji Onishi, Osaka (JP); Hiroki Tanabe, Osaka (JP); Yu Notoji, Osaka (JP); Shohei Minamihara, Osaka (JP)

(73) Assignee: NIPPON PILLAR PACKING CO., LTD., Osaka (JP)

( * ) Notice: Subject to any disclaimer, the term of this patent is extended or adjusted under 35 U.S.C. 154(b) by 0 days.

(21) Appl. No.: 18/259,656

(22) PCT Filed: Nov. 22, 2021

(86) PCT No.: PCT/JP2021/042748
§ 371 (c)(1),
(2) Date: Jun. 28, 2023

(87) PCT Pub. No.: WO2022/180958
PCT Pub. Date: Sep. 1, 2022

(65) Prior Publication Data
US 2024/0003469 A1 Jan. 4, 2024

(30) Foreign Application Priority Data
Feb. 26, 2021 (JP) .................. 2021-029873

(51) Int. Cl.
*F16L 19/025* (2006.01)
(52) U.S. Cl.
CPC .................. *F16L 19/025* (2013.01)
(58) Field of Classification Search
CPC ...... F16L 19/025; F16L 19/0225; F16L 31/00
See application file for complete search history.

(56) References Cited

U.S. PATENT DOCUMENTS 5,580,103 A * 12/1996 Hall ............... F16L 19/0225
285/354
5,707,152 A * 1/1998 Krywitsky ............ F16L 19/025
374/208

(Continued)

FOREIGN PATENT DOCUMENTS

EP 2781817 A1 * 9/2014 ......... F16L 19/0225
ES 2832584 A1 * 6/2021 ............ F16L 19/025

(Continued)

OTHER PUBLICATIONS

International Search Report issued Jan. 25, 2022 in PCT/JP2021/042748 filed on Nov. 22, 2021 citing documents 1, 15-19 therein, 2 pages.

*Primary Examiner* — Matthew Troutman
*Assistant Examiner* — Fannie Kee
(74) *Attorney, Agent, or Firm* — Oblon, McClelland, Maier & Neustadt, L.L.P.

(57) ABSTRACT

A fitting body is tubular, whose first and second axial end portions include a connector for a tube and an annular groove, respectively. A sleeve has first and second axial end portions including an annular protrusion and a connector for another tube, respectively. A nut is engaged with an external thread of the fitting body or the sleeve. Engagement of the external thread with the nut causes press-fit of the annular protrusion into the annular groove to form a seal region. Under a condition that a depth of the annular groove is three or more times as large as a thickness of a radially inward or outward wall of the annular groove, an axial distance from the seal region to a bottom of the annular groove exceeds ten times an increment width of the annular groove caused by the press-fit of the annular protrusion into the annular groove.

2 Claims, 10 Drawing Sheets

(56) References Cited

U.S. PATENT DOCUMENTS

| | | | |
|---|---|---|---|
| 6,045,164 A | 4/2000 | Nishio | |
| 2006/0086492 A1* | 4/2006 | Kato | F16L 19/025 |
| | | | 165/177 |
| 2006/0244256 A1* | 11/2006 | Hyobu | F16L 19/025 |
| | | | 285/354 |
| 2016/0061357 A1* | 3/2016 | Fujii | F16L 19/025 |
| | | | 285/382.5 |
| 2016/0061361 A1* | 3/2016 | Fujii | F16L 19/025 |
| | | | 285/382.5 |
| 2016/0116096 A1* | 4/2016 | Fujii | F16L 19/025 |
| | | | 285/386 |
| 2017/0146161 A1 | 5/2017 | Fujii et al. | |
| 2017/0159854 A1* | 6/2017 | Fujii | F16L 19/025 |

FOREIGN PATENT DOCUMENTS

| | | | | |
|---|---|---|---|---|
| JP | 59-24585 U | | 2/1984 | |
| JP | 11-218272 A | | 8/1999 | |
| JP | 2016-70387 A | | 5/2016 | |
| JP | 2020-98004 A | | 6/2020 | |
| JP | 2021-4643 A | | 1/2021 | |
| KR | 20220107976 A | * | 8/2022 | ............ F16L 19/025 |
| WO | WO-2004027305 A1 | * | 4/2004 | ............ F16L 19/025 |
| WO | WO-2004109174 A1 | * | 12/2004 | .......... F16L 19/0225 |

\* cited by examiner

FIG.4

| | | ΔX (mm) | | | | | | | |
|---|---|---|---|---|---|---|---|---|---|
| | | 0.10 | | 0.20 | | 0.30 | | 0.40 | |
| | | torque | seal | torque | seal | torque | seal | torque | seal |
| LW (mm) | 1 | × | ○ | × | ○ | × | ○ | × | ○ |
| | 2 | ○ | ○ | × | ○ | × | ○ | × | ○ |
| | 3 | ○ | ○ | ○ | ○ | × | ○ | × | ○ |
| | 4 | ○ | ○ | ○ | ○ | ○ | ○ | × | ○ |
| | 5 | ○ | ○ | ○ | ○ | ○ | ○ | ○ | ○ |
| | 6 | ○ | ○ | ○ | ○ | ○ | ○ | ○ | ○ |
| | 7 | ○ | ○ | ○ | ○ | ○ | ○ | ○ | ○ |
| | 8 | ○ | × | ○ | ○ | ○ | ○ | ○ | ○ |
| | 9 | ○ | × | ○ | × | ○ | ○ | ○ | ○ |
| | 10 | ○ | × | ○ | × | ○ | × | ○ | ○ |

TUBE FITTING

TECHNICAL FIELD

The invention relates to tube fittings, in particular, those using combination of annular protrusion and groove for a seal.

BACKGROUND ART

Manufacture of semiconductors, medical supplies, medicines, foods or the like uses various chemical solutions or ultrapure water. It is desirable that piping equipment for use of such chemical solutions or the like should be easy to assemble due to necessity of frequent maintenance such as washing. The same is true for piping equipment installed in vehicles to carry gasoline, coolant water, exhaust gas or the like. Accordingly, for such pipe equipment, tube fittings capable of facilitating connection of tubes are useful.

As such a tube fitting, one disclosed in JP 2016-070387 A is known, for example, which includes a tubular body, a sleeve, and a union nut. The fitting body has a first axial end portion including a connector for a tube and a second axial end portion including an annular groove and an external thread. The sleeve has a first axial end portion including an annular protrusion and a second axial end portion including a connector for another tube. The union nut has an internal thread to be engaged with the external thread of the fitting body. The union nut, when being screwed into the external thread with the sleeve coaxially installed thereinside, pushes the sleeve against the fitting body, and thus, the annular protrusion of the sleeve is press-fitted into the annular groove of the fitting body. Then, regions where surfaces of the annular protrusion tightly contact surfaces of the annular groove, i.e., seal regions are formed to seal gaps between the sleeve and the fitting body. Screwing the union nut into the external thread enables the press-fit of the annular protrusion into the annular groove more easily and reliably than pushing the sleeve against the fitting body directly with bare hands, and therefore, the tube fitting is easy to connect tubes with each other.

CITATION LIST

Patent Literature 1: JP 2016-070387 A

SUMMARY OF INVENTION

In seal regions formed between an annular protrusion and an annular groove, in general, surface pressure greatly exceeds a level necessary for sealing even if there is only a tiny difference between the thickness of the annular protrusion and the width of the annular groove. Accordingly, use of annular protrusion and groove for sealing the tube fitting is advantageous in enhancement of seal performance of the tube fitting, but disadvantageous in improvement of operability of the tube fitting for connection/disconnection of tubes since great force is necessary both to press-fit the annular protrusion into the annular groove and to pull the protrusion out of the groove.

In the tube fitting disclosed in JP 2016-070387 A, the difference $D2-D1$ between the thickness of the annular protrusion and the width of the annular groove before press-fit of the annular protrusion into the annular groove is designed to be tan 5° to tan 15° times as large as the axial distance $L2-L1$ from the tip of the annular protrusion to the bottom of the annular groove after the press-fit. This design successfully reduces the force necessary to pull the annular protrusion out of the annular groove to a limited level, but it fails to reduce the force necessary to press-fit the annular protrusion into the annular groove to a degree that keeps a tightening torque of the union nut at a level that bare hands can generate. Accordingly, it is difficult to further improve the operability of the tube fitting for connection of tubes.

An object of the invention is to solve the above-mentioned problems, in particular, to provide a tube fitting that enables its body to be connected to its sleeve with bare hands while keeping sufficiently high seal performance between the body and the sleeve.

According to one aspect of the invention, a tube fitting is used for connecting a first tube with a second tube and includes a fitting body, a sleeve, and a nut. The fitting body has a tubular shape whose first axial end portion includes a connector for the first tube, and whose second axial end portion includes an annular groove. The sleeve has a first axial end portion including an annular protrusion and an external thread, and a second axial end portion including a connector for the second tube. The nut includes an internal thread to be engaged with the external thread. Engagement of the external thread of the sleeve with the internal thread of the nut causes press-fit of the annular protrusion of the sleeve into the annular groove of the fitting body to form a seal region between the annular protrusion and the annular groove. Under a condition that a depth of the annular groove is three or more times as large as a thickness of a radially inward or outward wall of the annular groove, an axial distance from the seal region to a bottom of the annular groove is designed to exceed ten times an increment width of the annular groove caused by the press-fit of the annular protrusion into the annular groove. The nut may be integrated as a single piece with the second axial end portion of the fitting body.

According to another aspect of the invention, a tube fitting is used for connection of a first tube with a second tube and includes a fitting body, a sleeve, and a nut. The fitting body has a tubular shape whose first axial end portion includes a connector for the first tube, and whose second axial end portion includes an annular groove and an external thread. The sleeve has a first axial end portion including an annular protrusion and a second axial end portion including a connector for the second tube. The nut includes an internal thread to be engaged with the external thread. Engagement of the external thread with the internal thread causes press-fit of the annular protrusion into the annular groove to form a seal region between the annular protrusion and the annular groove. Under a condition that a depth of the annular groove is three or more times as large as a thickness of a radially inward or outward wall of the annular groove, an axial distance from the seal region to a bottom of the annular groove is designed to exceed ten times an increment width of the annular groove caused by the press-fit of the annular protrusion into the annular groove. The nut may be integrated as a single piece with the first axial end portion of the sleeve.

When the axial distance from the seal region between the annular protrusion and the annular groove to the bottom of the annular groove is divided by the increment width of the annular groove caused by the press-fit of the annular protrusion into the annular groove, the quotient corresponds to a shear strain that appears on the radially inward or outward wall of the annular groove. Reduction of this shear strain leads to fall of surface pressure in the seal region. For the above-described tube fitting according to the invention, the shear strain is designed to be less than $\frac{1}{10}$ so that the force necessary to press-fit the annular protrusion into the annular groove is reduced to a degree that keeps a tightening torque of the nut at a level that bare hands can generate.

In contrast to the tube fitting disclosed in JP 2016-070387 A, the above-described tube fitting according to the invention can prevent leakage in the seal region even when the above-mentioned shear strain is less than 1/10 since the depth of the annular groove is three or more times as large as the thickness of the radially inward or outward wall thereof. Even when the axial distance from the seal region between the annular protrusion and the annular groove to the bottom of the annular groove is designed to exceed ten times the increment width of the annular groove caused by the press-fit of the annular protrusion into the annular groove, the design of the sufficiently large depth of the annular groove can secure a sufficiently large axial length of the seal region.

As such, the above-described tube fitting according to the invention can, without leakage in the seal region, reduce the force necessary to press-fit the annular protrusion into the annular groove to keep a tightening torque of the nut at a level that bare hands can generate, in contrast to the tube fitting disclosed in JP 2016-070387 A. In other words, the above-described tube fitting according to the invention enables the sleeve to be connected to the fitting body with bare hands while keeping the sufficiently high seal performance between the sleeve and the fitting body.

BRIEF DESCRIPTION OF DRAWINGS

FIG. 4 is a table that represents whether or not the tightening torque of the nut is kept at a level that bare hands can generate and whether or not leakage occurs in the seal region for various combinations of values of the axial distance LW and the increment width ΔX shown in FIG. 3B; the axial distance LW is from the seal region between the annular protrusion and the annular groove to the bottom of the annular groove; the increment width ΔX is that of the annular groove caused by press-fit of the annular protrusion into the annular groove;

DESCRIPTION OF EMBODIMENTS

The following will describe embodiments of the invention with reference to attached figures.

Embodiment 1

Figure 1:
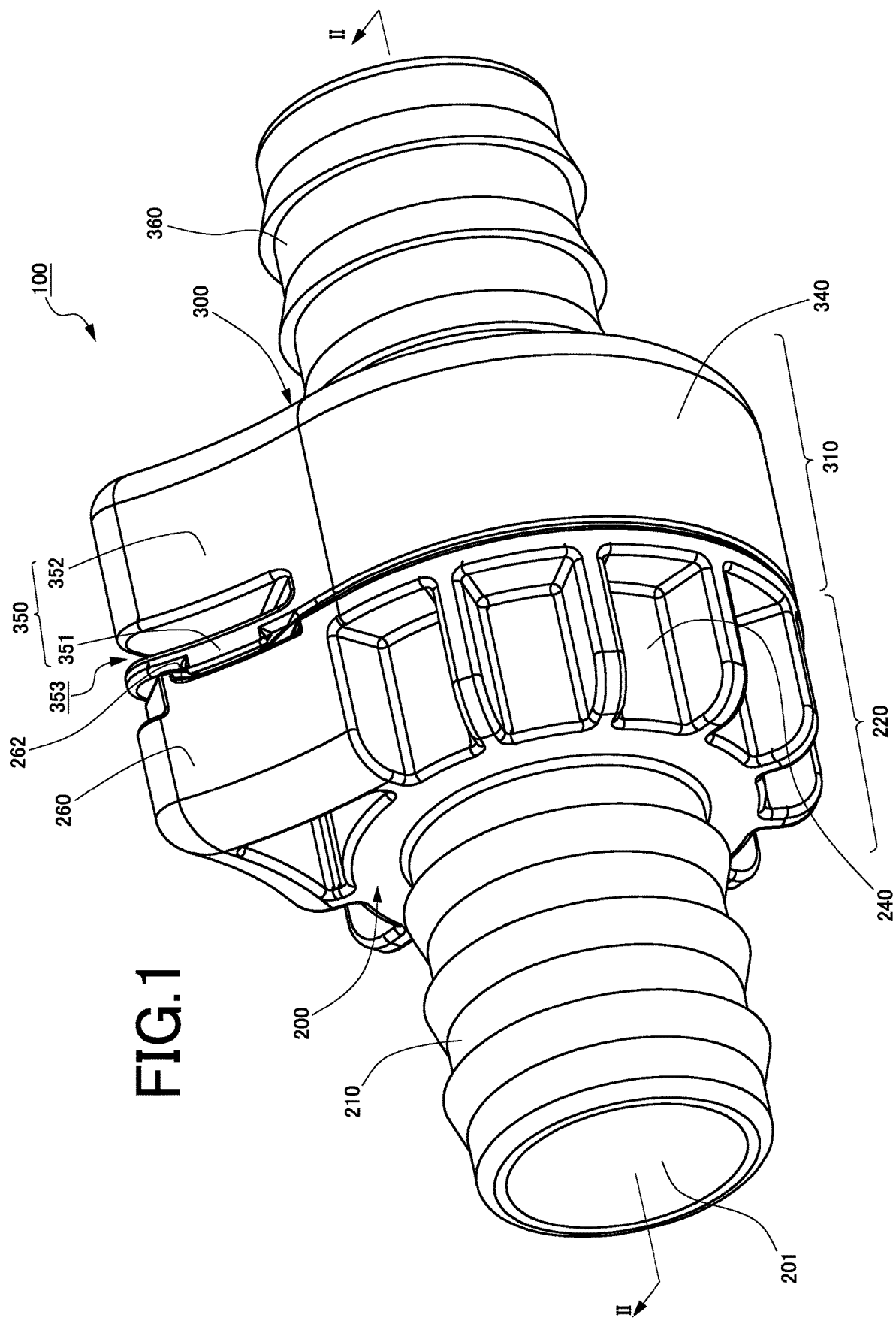
FIG. 1 is a perspective view showing an appearance of a tube fitting according to embodiment 1 of the invention.
Figure 2:
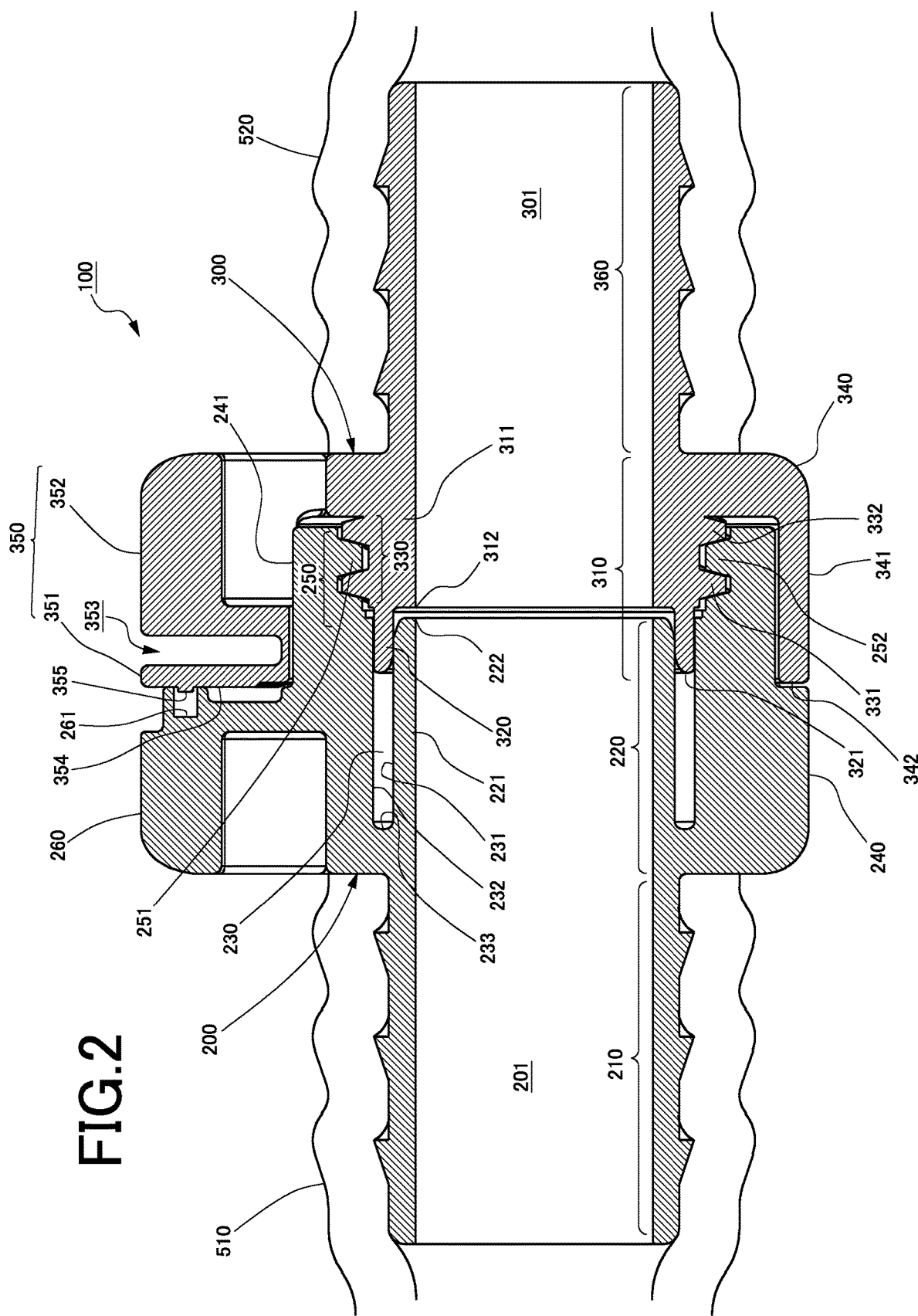
FIG. 2 is a cross-section view along a line II-II in FIG. 1.

FIG. 1 is a perspective view showing an appearance of a tube fitting 100 according to embodiment 1 of the invention. FIG. 2 is a cross-section view along a line II-II in FIG. 1. The tube fitting 100 is used for, for example, connecting a first hose 510 with a second hose 520 in cooling lines for a battery pack of an electric vehicle (EV), as shown in FIG. 2. These hoses 510 and 520 are made of, for example, resin such as high-density polyethylene (HDPE) and used as lines allowing coolant water (LLC) to flow therethrough.

The tube fitting 100 consists of a body 200 and a sleeve 300, both of which are tubular members made of resin such as polyamide (PA) or glass-reinforced polyamide (PA-GF). As shown in FIG. 2, the fitting body 200 is connected with the first hose 510 and the sleeve 300 is connected with the second hose 520. An inner cavity 201 of the fitting body 200 and an inner cavity 301 of the sleeve 300 have circular cross-sections perpendicular to their respective axial directions, which have the same diameters. As shown in FIGS. 1 and 2, when the fitting body 200 and the sleeve 300 are coaxially connected with each other, their inner cavities 201 and 301 allow the inside of the first hose 510 to communicate with the inside of the second hose 520 therethrough. In other words, the inner cavities 201 and 301 serve as a channel connecting the two hoses 510 and 520 and allowing LLC to flow therethrough.

[Structure of Fitting Body]

One axial end portion 210 (which is hereinafter referred to as "first axial end portion") of the fitting body 200 is a connector for the first hose 510, which is coaxially placed within the first hose 510, as shown in FIG. 2. Since the outer diameter of the first axial end portion 210 is larger than the inner diameter of the first hose 510, the first axial end portion 210 pushes the opening end of the first hose 510 radially outward when the first axial end portion 210 is press-fitted into the first hose 510. Then, a restoring force of the opening end squeezes the first axial end portion 210 radially inward, and thus, the first hose 510 is fixed to the first axial end portion 210 and seals a gap between its inner periphery and an outer periphery of the first axial end portion 210.

The other axial end portion 220 (which is hereinafter referred to as "second axial end portion") of the fitting body 200 is a junction with the sleeve 300, which includes an inner cylinder 221, an annular groove 230, and a nut 240.

The inner cylinder 221 is a circular-cylindrical portion defining the inner cavity 201 of the fitting body 200. The annular groove 230 is a circular-ring-shaped groove coaxially surrounding the inner cylinder 221. A radially inward surface 231 of the annular groove 230 is formed by an outer periphery of the inner cylinder 221.

The nut 240 is a substantially circular-cylindrical portion coaxially surrounding the annular groove 230, whose outer diameter is larger than the outer diameter of the first axial end portion 210. A portion of an inner periphery of the nut 240 forms a radially outward surface 232 of the annular groove 230. In the vicinity of the boundary between the first axial end portion 210 and second axial end portion 220 of the fitting body 200, the nut 240 is connected and integrated with the inner cylinder 221 as a single piece and forms a bottom 233 of the annular groove 230. In the vicinity of an opening portion 222 of the inner cylinder 221, the nut 240 extends toward the axial direction of the fitting body 200 (rightward in FIG. 2), and a portion of the nut 240 reaches beyond the axial position of the opening portion 222 of the inner cylinder 221. An inner periphery of the portion of the nut 240 is provided with an internal thread 250, which is a double start thread, for example. Two thread ridges 251 and 252 spiral along the inner periphery of the nut 240.

The nut 240 further includes a first engaging portion 260, which is a projection that protrudes radially outward (upward in FIGS. 1 and 2) from a circumferential section of the outer periphery of the nut 240 (the top section thereof in FIGS. 1 and 2). A surface of the first engaging portion 260 whose position in the axial direction of the fitting body 200 is close to the opening portion 222 of the inner cylinder 221 (on the right side in FIG. 2) has an engaging hole 261.

[Structure of Sleeve]

One axial end portion 310 (which is hereinafter referred to as "first axial end portion") of the sleeve 300 is a junction with the fitting body 200, which includes an inner cylinder 311, an annular protrusion 320, an external thread 330, a flange 340, and a second engaging portion 350.

The inner cylinder 311 is a circular-cylindrical portion defining the inner cavity 301 of the sleeve 300. The annular protrusion 320 is a circular-ring-shaped protrusion coaxially surrounding an opening portion 312 of the inner cylinder 311 and extending toward the axial direction of the sleeve 300 (leftward in FIG. 2) from the rim of the opening portion 312. The external thread 330 is provided at an outer periphery of the inner cylinder 311 and engageable with the internal thread 250 of the fitting body 200. In particular, the external thread 330 is a multi-start thread having the same number of thread ridges as those of the internal thread 250, for example, a double start thread. Two thread ridges 331 and 332 spiral along an outer periphery of the inner cylinder 311.

The flange 340 is a substantially circular-cylindrical portion coaxially surrounding the inner cylinder 311 and the annular protrusion 320, whose outer diameter is larger than the outer diameter of the other axial end portion 360 (which is hereinafter referred to as "second axial end portion") of the sleeve 300. In the vicinity of the boundary between the first axial end portion 310 and second axial end portion 360 of the sleeve 300, the flange 340 is connected and integrated with the first axial end portion 310 as a single piece. In the vicinity of a tip 321 of the annular protrusion 320, the flange 340 extends toward the axial direction of the sleeve 300 (leftward in FIG. 2) and reaches beyond the axial position of the tip 321 of the annular protrusion 320.

The second engaging portion 350 is a projection that protrudes radially outward (upward in FIGS. 1 and 2) from a circumferential section of an outer periphery 341 of the flange 340 (the top section thereof in FIGS. 1 and 2). As shown in FIG. 1, when the sleeve 300 is properly connected with the fitting body 200, the second engaging portion 350 is located at the same position as the first engaging portion 260 of the fitting body 200 in a common circumferential direction shared by the fitting body 200 and the sleeve 300.

The second engaging portion 350 includes a thin-plate part 351 and a thick-plate part 352, which are plate-like parts perpendicular to the axial direction of the sleeve 300 (the left-right direction in FIG. 2.) The thin-plate part 351 has an axial thickness smaller than that of the thick-plate part 352. The thin-plate part 351 is located at substantially the same axial position as the tip 342 of the flange 340. The thick-plate part 352 is located within substantially the same axial range as that of the inner cylinder 311. There is an axial gap 353 between the thin-plate part 351 and the thick-plate part 352. From a surface 354 of the thin-plate part 351 facing the first engaging portion 260 of the fitting body 200 when the sleeve 300 is connected with the fitting body 200 as shown in FIG. 2 (the left-side surface of the thin-plate part 351 in FIG. 2), an engaging projection 355 protrudes toward the axial direction of the sleeve 300 (leftward in FIG. 2). An axial length of the engaging projection 355, shapes and sizes of cross-sections thereof perpendicular to the axial direction, and a radial position thereof are designed such that the engaging projection 355 is placed within the engaging hole 261 when the sleeve 300 is connected with the fitting body 200 as shown in FIG. 2.

The second axial end portion 360 of the sleeve 300 is a connector for the second hose 520, which is coaxially placed within the second hose 520, as shown in FIG. 2. Since the outer diameter of the second axial end portion 360 is larger than the inner diameter of the second hose 520, the second axial end portion 360 pushes an opening end of the second hose 520 radially outward when the second axial end portion 360 is press-fitted into the second hose 520. Then, a restoring force of the opening end squeezes the second axial end portion 360 radially inward, and thus, the second hose 520 is fixed to the second axial end portion 360 and seals a gap between its inner periphery and an outer periphery of the second axial end portion 360.

[Work of Connecting Hoses Through Tube Fitting]

A work of connecting the first hose 510 with the second hose 520 through the tube fitting 100 is performed according to the following steps. At first, the first axial end portion 210 of the fitting body 200 is press-fitted into the opening end of the first hose 510, and the second axial end portion 360 of the sleeve 300 is press-fitted into the opening end of the second hose 520. Next, the external thread 330 is screwed into the internal thread 250 of the nut 240.

Since the fitting body 200 is integrated with the nut 240, one of the fitting body 200 and the sleeve 300 has to be rotated relative to the other thereof around a common axis to screw the external thread 330 into the internal thread 250. Already, the first hose 510 has been fixed to the fitting body 200 and the second hose 520 has been fixed to the sleeve 300, and accordingly, the relative rotation of the fitting body 200 and the sleeve 300 twists at least one of the first hose 510 and the second hose 520. Preferably, either the first hose 510 or the second hose 520 is twisted before the external thread 330 is screwed into the internal thread 250. The twist is formed such that its angle is the same as that of relative rotation of the internal thread 250 and the external thread 330 necessary for connection therebetween, but its direction is opposite to that of the relative rotation. As a result, both the first hose 510 and the second hose 520 can be untwisted when the external thread 330 has been completely screwed into the internal thread 250.

Hereinafter, a rotation angle between the internal thread 250 and the external thread 330 when thread ridges of one of them start to enter spaces between thread ridges of the other is referred to as "engagement start position." Another rotation angle between the threads 250 and 330 when an axial length of a portion of the external thread 330 placed radially inside the internal thread 250 reaches a desired value is referred to as "engagement finish position." The rotation angle from an engagement start position to an engagement finish position is a rotation angle between the threads 250 and 330 necessary for connection therebetween.

In particular, the rotation angle between the internal thread 250 and the external thread 330 necessary for connection therebetween is designed to fall within a range. At any angle within the range, a worker can twist with one hand either the first hose 510 connected with the fitting body 200 or the second hose 520 connected with the sleeve 300. More specifically, the range may be, for example, 180° or less, or preferably, 90° or less. This design is attainable, for example, by adjusting the numbers of thread ridges or pitches of the threads 250 and 330. This design enables the worker to twist either thread 250 or 330 at a desired angle only by twisting one hand, which holds one of the fitting body 200 and the sleeve 300, relative to the opposite hand, which holds the other thereof.

[Seal Between Fitting Body and Sleeve]

The annular groove 230 of the fitting body 200 and the annular protrusion 320 of the sleeve 300 are designed such that the annular protrusion 320 can be press-fitted into the annular groove 230 when the fitting body 200 is connected with the sleeve 300 as shown in FIG. 2. In particular, the inner diameter of the annular protrusion 320 is slightly smaller than the diameter of the radially inward surface 231 of the annular groove 230, and/or the outer diameter of the annular protrusion 320 is slightly larger than the diameter of the radially outward surface 232 of the annular groove 230. Accordingly, when the annular protrusion 320 is press-fitted into the annular groove 230 as shown in FIG. 2, a seal region is formed between the radially inward surface 231 of the annular groove 230 and the inner periphery of the annular protrusion 320, and/or between the radially outward surface 232 of the annular groove 230 and the outer periphery of the annular protrusion 320. Thus, gaps between the fitting body 200 and the sleeve 300 are sealed.

Force that press-fits the annular protrusion 320 of the sleeve 300 into the annular groove 230 of the fitting body 200 is an axial force that the annular protrusion 320 receives when the external thread 330 of the sleeve 300 is screwed into the internal thread 250 of the nut 240. Unevenness of this axial force in the circumferential direction of the annular protrusion 320 is smaller than that of axial force that the annular protrusion 320 receives when the fitting body 200 and the sleeve 300 are axially pushed against each other directly with bare hands. In addition, increase in tightening torque of the nut 240 can more easily increase the force that press-fits the annular protrusion 320 into the annular groove 230 than direct increase in the axial force that pushes the fitting body 200 and the sleeve 300 against each other.

Since having dimensional characteristics described later, the tube fitting 100 further allows the tightening torque of the nut 240 to be reduced to a level that bare hands can generate. Accordingly, a worker can rotate the internal thread 250 and the external thread 330 to an engagement finish position only by the following steps: At first, one hand holding the fitting body 200 and the opposite hand holding the sleeve 300 are twisted relative to each other as described above. Next, the twisted hands bring the threads 250 and 330 into contact with each other in an engagement start position. Finally, the hands are untwisted.

Figure 3A:
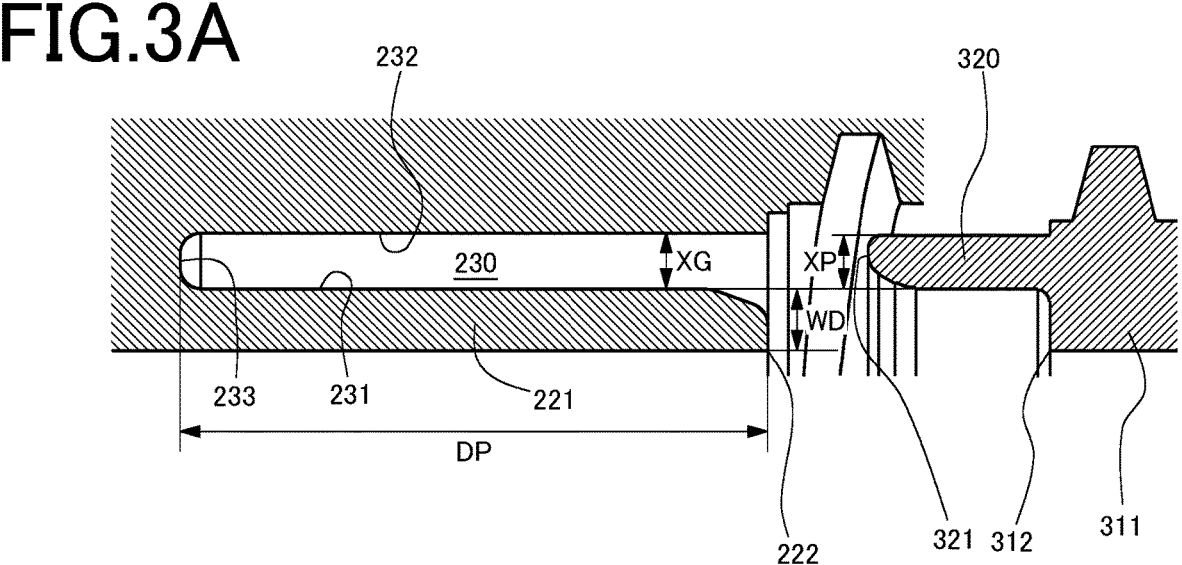
FIG. 3A is an enlarged cross-section view of the annular protrusion and groove and their respective vicinities before the annular protrusion is press-fitted into the annular groove.

FIG. 3A is an enlarged cross-section view of the annular groove 230, the annular protrusion 320, and their respective vicinities before the annular protrusion 320 is press-fitted into the annular groove 230. The width XG of the annular groove 230 is slightly smaller than the thickness XP of the annular protrusion 320 before the annular protrusion 320 is press-fitted into the annular groove 230. In particular, the inner diameter of the annular protrusion 320 is slightly smaller than the diameter of the radially inward surface 231 of the annular groove 230, and/or the outer diameter of the annular protrusion 320 is slightly larger than the diameter of the radially outward surface 232 of the annular groove 230. In addition, the depth DP of the annular groove 230 is three or more times as large as the thickness WD of a radially inward wall of the annular groove 230, i.e., the inner cylinder 221.

Figure 3B:
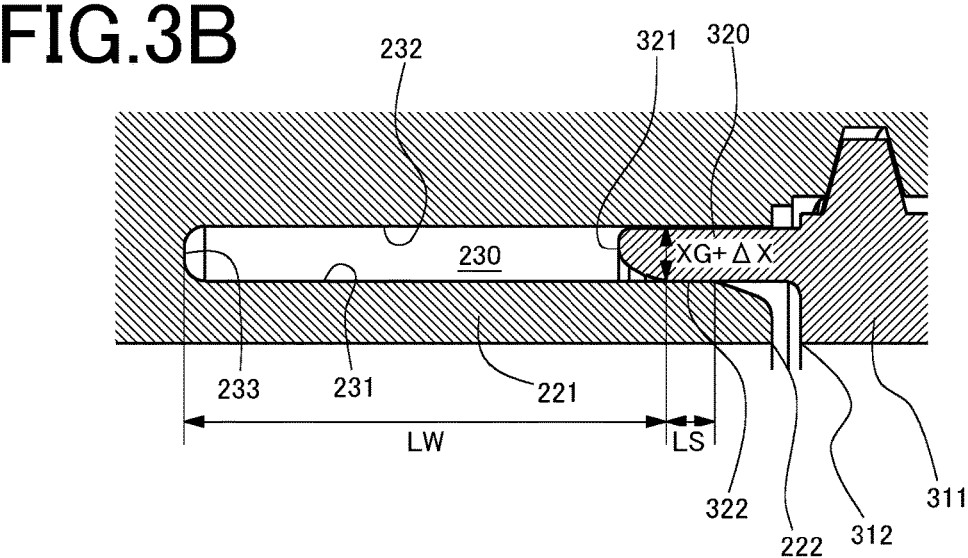
FIG. 3B is an enlarged cross-section view of the annular protrusion and groove and their respective vicinities after the annular protrusion is press-fitted into the annular groove.

FIG. 3B is an enlarged cross-section view of the annular groove 230, the annular protrusion 320, and their respective vicinities after the annular protrusion 320 is press-fitted into the annular groove 230. The press-fit of the annular protrusion 320 into the annular groove 230 forms a seal region 322 between the radially inward surface 231 of the annular groove 230 and the inner periphery of the annular protrusion 320. In the axial direction of the fitting body 200 (the left-right direction in FIG. 3B), the seal region 322 is located at a distance LW from the bottom 233 of the annular groove 230 and extends within a range of a length LS. Surface pressure in the seal region 322 bends the inner cylinder 221, and thus, within the axial range from the seal region 322 to the bottom 233 of the annular groove 230, a portion closer to the seal region 322 is more largely displaced radially inward (downward in FIG. 3B). As a result, in the seal region 322, the width of the annular groove 230 increases by an increment $\Delta X$ from the value XG before the annular protrusion 320 is press-fitted into the annular groove 230. This increment $\Delta X$ is mainly determined by a difference XP-XG between the width XG of the annular groove 230 and the thickness XP of the annular protrusion 320 before the press-fit.

Under the condition that the depth DP of the annular groove 230 is three or more times as large as the thickness WD of the inner cylinder 221, the axial distance LW from an edge of the seal region 322 to the bottom 233 of the annular groove 230 is designed to exceed ten times the increment width $\Delta X$ of the annular groove 230 caused by press-fit of the annular protrusion 320 into the annular groove 230. This design can reduce the force necessary for the press-fit to keep the tightening torque of the nut 240 at a level that bare hands can generate, without leakage in the seal region 322. This was confirmed by experiments with prototypes of the tube fitting 100 as described below.

In these experiments, at first, a plurality of prototypes of the tube fitting 100 was made. For every prototype, PA was used as materials of the fitting body 200 and the sleeve 300, and the thickness WD of the inner cylinder 221 was set at a common value 1 mm. In addition, the axial length of the annular protrusion 320 was set at a common value to uniform the axial length LS of the seal region 322 at a common value. On the other hand, the depth DP of the annular groove 230 and the difference XP-XG between the width XG of the annular groove 230 and the thickness XP of the annular protrusion 320 were set at different values for different prototypes. The depth DP of the annular groove 230 was selected within a range from a value three or more times as large as the thickness WD of the inner cylinder 221, i.e., a range from 3 mm or more, such that the axial distance LW from an edge of the seal region 322 to the bottom 233 of the annular groove 230 was changed from 1 mm to 10 mm with 1 mm increments. The difference XP-XG was selected such that the increment width $\Delta X$ of the annular groove 230 caused by the press-fit of the annular protrusion 320 was changed from 0.10 mm to 0.40 mm with 0.10 mm increments.

Next, the following two tests were performed for each prototype.

Torque test: Whether or not the tightening torque of the nut 240 is kept at a level that bare hands can generate;

Seal test: Whether or not leakage occurs in the seal region 322.

In the torque test, the level that bare hands can generate was set at 3.0 Nm, and the requirement of acceptance was that an actual tightening torque of the nut 240 does not exceed the level. In the seal test, LLC of the same temperature and the same pressure as those of an actual usage state in a vehicle flowed through the inner cavities 201 and 301 of each prototype, and the requirement of acceptance was that no leakage of the LLC occurs in the seal region 322.

FIG. 4 is a table that represents results of the torque and seal tests for each combination of the axial distance LW and the increment width ΔX. In this table, circles represent acceptance and crosses represent rejection. In addition, hatched cells correspond to combinations in which the result of at least one of the torque and seal tests was rejection.

As shown in FIG. 4, among the prototypes with the increment width ΔX of 0.10 mm, one with the axial distance LW of 1 mm was rejected at the torque test, and ones with the axial distances LW of 8 mm or more were rejected at the seal test. Among the prototypes with the increment width ΔX of 0.20 mm, ones with the axial distances LW of 2 mm or less were rejected at the torque test, and ones with the axial distances LW of 9 mm or more were rejected at the seal test. Among the prototypes with the increment width ΔX of 0.30 mm, ones with the axial distances LW of 3 mm or less were rejected at the torque test, and one with the axial distances LW of 10 mm was rejected at the seal test. Among the prototypes with the increment width ΔX of 0.40 mm, ones with the axial distances LW of 4 mm or less were rejected at the torque test. Other prototypes were accepted at both the torque and seal tests.

From these results, the following things were confirmed. Even when the increment width ΔX was any of 0.10 mm to 0.40 mm, the axial distance LW that exceeds ten times the increment width ΔX kept the tightening torque of the nut 240 at a level that bare hands can generate. On the other hand, an upper limit of the axial distance LW that meets the condition that no leakage occurs in the seal region 322 was 70 times the increment width ΔX=0.10 mm, 40 times the increment width ΔX=0.20 mm, 30 times the increment width ΔX=0.30 mm, and 25 times the increment width ΔX=0.40 mm. In every case, the upper limit of the axial distance LW greatly exceeds 10 times the increment width ΔX. Accordingly, even when the increment width ΔX is any of 0.10 mm to 0.40 mm, the axial distance LW able to keep the tightening torque of the nut 240 at a level that bare hands can generate can be selected within the range from a value exceeding 10 times the increment width ΔX, without leakage in the seal region 322.

—Differences from Tube Fitting Disclosed in JP 2016-070387 A—

The ratio of the increment width ΔX to the axial distance LW, ΔX/LW, i.e., a shear strain of the inner cylinder 221 is substantially the same parameter as the ratio (D2−D1)/(L2−L1) disclosed in JP 2016-070387 A. However, a range of the shear strain ΔX/LW, i.e., a range below 1/10 includes values less than the lower limit of the ratio (D2−D1)/(L2−L1), i.e., tan 5° nearly equal to 0.087. In other words, even when the shear strain ΔX/LW is equal to the ratio (D2−D1)/(L2−L1), no leakage can occur in the seal region 322 of the tube fitting 100, but leakage can occur between the annular protrusion and groove of the tube fitting disclosed in JP 2016-070387 A.

The reason why there is such difference of the tube fitting 100 from one disclosed in JP 2016-070387 A is that the depth DP of the annular groove 230 of the tube fitting 100 is three or more times as large as the thickness of the inner cylinder 221. For the tube fitting disclosed in JP 2016-070387 A, the only way to increase the distance L2−L1 is to reduce the axial length of the annular protrusion, and thus, there is no choice but to axially narrow the seal region between the annular protrusion and groove. In contrast, for the tube fitting 100, even when the axial distance LW is designed to exceed ten times the increment width ΔX, a sufficiently large depth DP of the annular groove 230 can secure a sufficiently large axial length LS of the seal region 322.

[Role of Engaging Portions]

In the work of connecting the internal thread 250 of the fitting body 200 with the external thread 330 of the sleeve 300, a worker can put his/her fingers on the engaging portions 260 and 350 to relatively rotate the fitting body 200 and the sleeve 300 around a common axis, and thus, the worker can easily exert circumferential force onto the fitting body 200 and the sleeve 300. In addition, the tip of the first engaging portion 260 is farther apart from the axis of the fitting body 200 than other portions of the fitting body 200, and the tip of the second engaging portion 350 is farther apart from the axis of the sleeve 300 than other portions of the sleeve 300. Accordingly, exerting circumferential force onto the tips of the engaging portions 260 and 350 can apply larger torque to the fitting body 200 and the sleeve 300 than exerting the same force onto other portions of the fitting body 200 and the sleeve 300.

When the internal thread 250 of the fitting body 200 is connected with the external thread 330 of the sleeve 300, change in rotation angle between the internal thread 250 and the external thread 330 is followed by displacement of the first engaging portion 260 of the fitting body 200 and the second engaging portion 350 of the sleeve 300 in a common circumferential direction of the fitting body 200 and the sleeve 300. When a rotation angle between the threads 250 and 330 reaches an engagement finish position, the engaging portions 260 and 350 are located at the same circumferential positions, as shown in FIG. 1. Accordingly, by seeing the engaging portions 260 and 350 located at the same circumferential positions, the worker can visually identify engagement of the threads 250 and 330 has been completed.

When a rotation angle between the internal thread 250 and the external thread 330 reaches an engagement finish position, the engaging projection 355 of the second engaging portion 350 is snap-fitted into the engaging hole 261 of the first engaging portion 260 as follows. Immediately before a rotation angle between the threads 250 and 330 reaches the engagement finish position, the engaging projection 355 hits a side surface 262 of the first engaging portion 260. Then, the thin-plate part 351 of the second engaging portion 350 bows toward the thick-plate part 352, and thus, the engaging projection 355 moves over the side surface 262 of the first engaging portion 260. When the threads 250 and 330 reaches the engagement finish position, the engaging projection 355 enters the engaging hole 261 and the bowing thin-plate part 351 returns to the original straight shape. In this manner, elasticity of the thin-plate part 351 is used to fit the engaging projection 355 into the engaging hole 261, and thus, the second engaging portion 350 is engaged with the first engaging portion 260 to fix the sleeve 300 to the fitting body 200.

The thin-plate part 351, when returning from the bowing shape to the straight one, slaps the side surface 262 of the first engaging portion 260. Then, sound of the slapping reverberates through the gap 353 between the thin-plate part 351 and the thick-plate part 352. By hearing the reverberating sound, a worker can confirm by ear if a rotation angle between the threads 250 and 330 reaches the engagement finish position.

[Merits of Embodiment 1]

In the tube fitting 100 according to embodiment 1 of the invention, under the condition that the depth DP of the annular groove 230 is three or more times as large as the thickness WD of the inner cylinder 221, the axial distance LW from the seal region 322 to the bottom 233 of the annular groove 230 is designed to exceed ten times the increment width ΔX of the annular groove 230 caused by the press-fit of the annular protrusion 320 into the annular groove 230. Thus, in contrast to the tube fitting disclosed in JP 2016-070387 A, the tube fitting 100 can reduce the force necessary for the press-fit to keep the tightening torque of the nut 240 at a level that bare hands can generate, without leakage in the seal region 322. In other words, the tube fitting 100 enables the sleeve 300 to be connected to the fitting body 200 with bare hands while keeping sufficiently high seal performance between the fitting body 200 and the sleeve 300. Therefore, the tube fitting 100 can achieve improved operability for connection of tubes.

Embodiment 2

Figure 5:
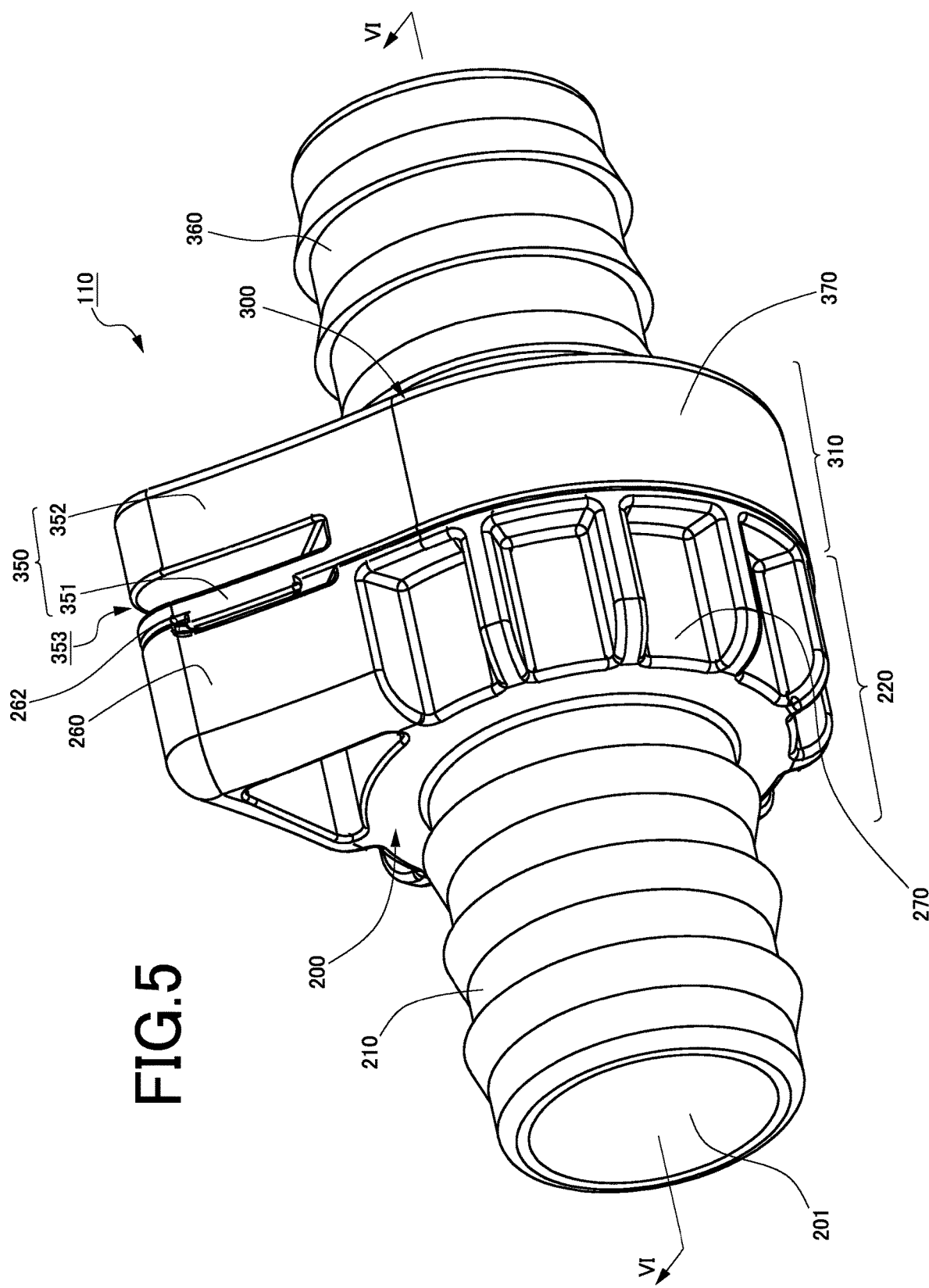
FIG. 5 is a perspective view showing an appearance of a tube fitting according to embodiment 2 of the invention.
Figure 6:
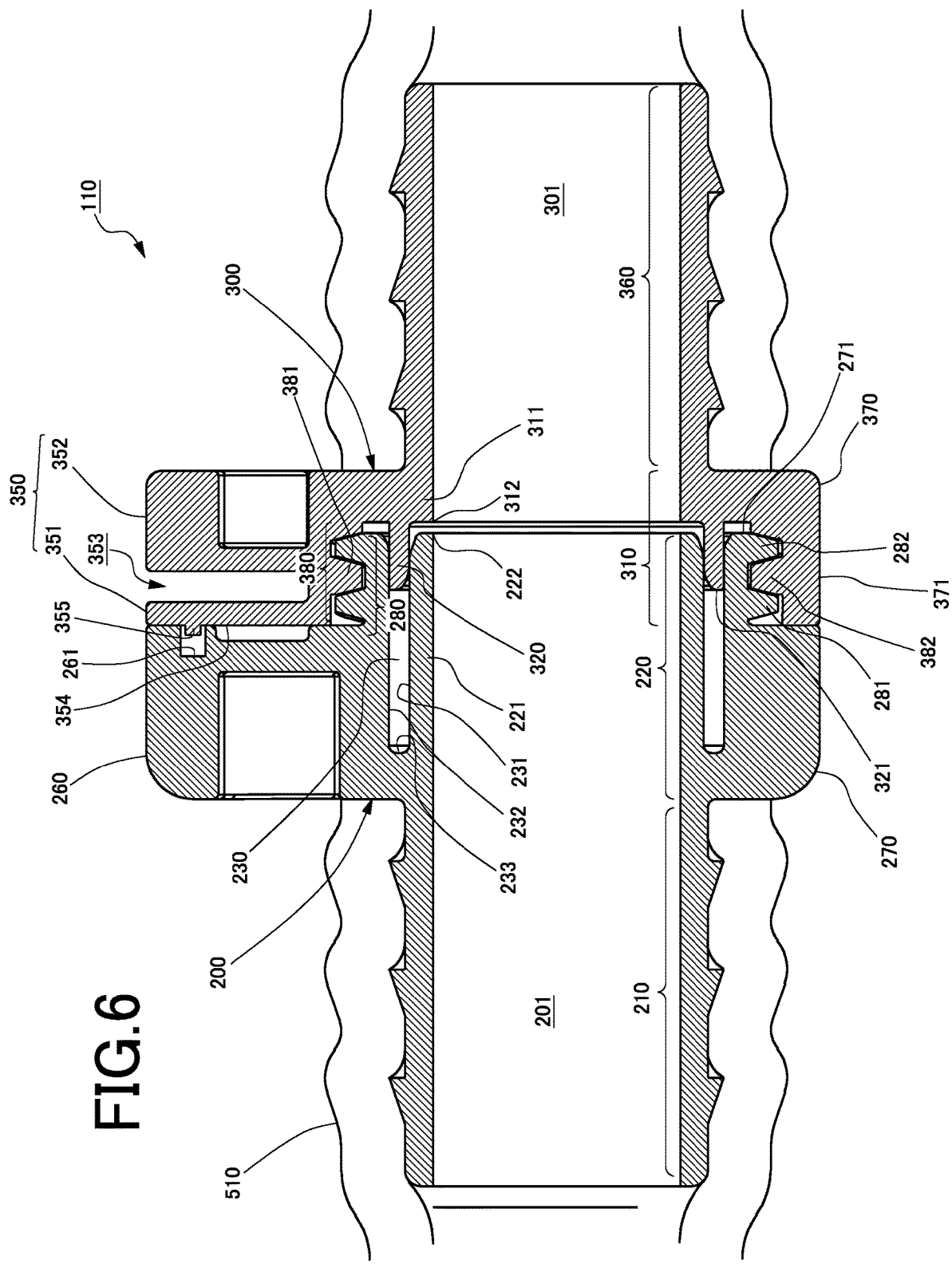
FIG. 6 is a cross-section view along a line VI-VI in FIG. 5.

FIG. 5 is a perspective view showing an appearance of a tube fitting 110 according to embodiment 2 of the invention. FIG. 6 is a cross-section view along a line VI-VI in FIG. 5. In contrast to the tube fitting 100 according to embodiment 1, the tube fitting 110 has an external thread provided to the fitting body 200 and an internal thread provided to the sleeve 300. Other components are similar in structure to those of the tube fitting 100 according to embodiment 1. In FIGS. 5 and 6, components similar in structure to those shown in FIGS. 1 and 2 are marked by the same numbers as those shown in FIGS. 1 and 2. In addition, the following explains portions of the tube fitting 110 different in structure from those of the tube fitting 100 according to embodiment 1, and explanation about other portions can be found in description of embodiment 1.

As shown in FIG. 6, the second axial end portion 220 of the fitting body 200 includes a flange 270 and an external thread 280, as well as the inner cylinder 221, the annular groove 230, and the first engaging portion 260. The flange 270 differs from the nut 240 according to embodiment 1 as follows. A tip 271 in the axial direction of the fitting body 200 (the left-right direction in FIG. 6) is located at the same axial position as the opening portion 222 of the inner cylinder 221. In addition, in the vicinity of the tip 271, the external thread 280 is provided on an outer periphery of the flange 270. The external thread 280 is a double start thread, for example. Two thread ridges 281 and 282 spiral along the outer periphery of the flange 270.

As shown in FIG. 6, the first axial end portion 310 of the sleeve 300 includes a nut 370, as well as the inner cylinder 311, the annular protrusion 320, and the second engaging portion 350. The nut 370 differs from the flange 340 according to embodiment 1 as follows. An inner periphery of the nut 370 is provided with an internal thread 380, which is, in particular, a multi-start thread with the same number of thread ridges as those of the external thread 280, for example, a double start thread. Two thread ridges 381 and 382 spiral along the inner periphery of the nut 370.

As shown in FIG. 2, in the sleeve 300 according to embodiment 1, the entirety of the annular protrusion 320 is located outside the range of the external thread 330 in the axial direction (the left-right direction in FIG. 2). Otherwise, not only the first axial end portion 310 of the sleeve 300 but also the second axial end portion 220 of the fitting body 200 would have been complex in structure and enlarged radially. In contrast, the sleeve 300 according to embodiment 2 allows the tip 321 of the annular protrusion 320 to be located inside the range of the internal thread 380 in the axial direction (the left-right direction in FIG. 6). The fitting body 200 according to embodiment 2 allows the external thread 280 to be located inside the range of the annular groove 230 in the axial direction (the left-right direction in FIG. 6). The second axial end portion 220 of the fitting body 200 and the first axial end portion 310 of the sleeve 300 shown in FIG. 6 are as complex in structure as those 220 and 310 shown in FIG. 2. In addition, the range of the annular protrusion 320 overlaps that of the internal thread 380 in the axial direction of the sleeve 300, and thus, it is easy to reduce the axial thickness of the first axial end portion 310 of the sleeve 300. Similarly, the range of the annular groove 230 overlaps that of the external thread 280 in the axial direction of the fitting body 200, and thus, it is easy to reduce the axial thickness of the second axial end portion 220 of the fitting body 200. Such reduction in thickness of the sleeve 300 and the fitting body 200 decreases amounts of material thereof, thus being advantageous to reduction in manufacturing cost of the tube fitting 110.

In the sleeve 300 according to embodiment 1, the flange 340 surrounds the tip 321 of the annular protrusion 320, as shown in FIG. 2. In the sleeve 300 according to embodiment 2, the nut 370 surrounds the tip 321 of the annular protrusion 320, as shown in FIG. 6. Since both the flange 340 and the nut 370 serve as a barrier for the tip 321 of the annular protrusion 320, the tip 321 is prevented from potential deformation and damage due to unconsidered contact with an external object such as the fitting body 200. In addition, the thread ridges 381 and 382 of the internal thread 380 protrude from the inner periphery of the nut 370, and thus, space around the annular protrusion 320 is narrower than the flange 340. Accordingly, for the function of the barrier protecting the tip 321, the nut 370 is more superb than the flange 340.

[Modifications]

(1) In the tube fitting 100 according to embodiment 1 of the invention, the nut 240 is integrated with the second axial end portion 220 of the fitting body 200 as a single piece. In the tube fitting 110 according to embodiment 2 of the invention, the nut 370 is integrated with the first axial end portion 310 of the sleeve 300 as a single piece. Accordingly, none of the tube fittings 100 and 110 needs a union nut in contrast to the tube fitting disclosed in JP 2016-070387 A, and thus, both of them enable reduction in manufacturing cost. However, integration of a nut with the fitting body or the sleeve is not essential for the invention. Like the tube fitting disclosed in JP 2016-070387 A, a tube fitting according to the invention may be equipped with a union nut as a component separated from both the fitting body and the sleeve. Even in this case, under the condition that the depth of the annular groove is three or more times as large as the thickness of the inner cylinder, the axial distance from the seal region between the annular groove and protrusion to the bottom of the annular groove is designed to exceed ten times the increment width of the annular groove caused by the press-fit of the annular protrusion into the annular groove. Then, a tightening torque of the union nut can be kept at a level that bare hands can generate, without leakage in the seal region.

(2) Both the nut 240 according to embodiment 1 and the flange 270 according to embodiment 2 have a substantially circular-cylindrical shape, and from a circumferential section thereof, the first engaging portion 260 protrudes. Both the flange 340 according to embodiment 1 and the nut 370 according to embodiment 2 have a substantially circular-cylindrical shape, and from a circumferential section thereof, the second engaging portion 350 protrudes. However, the nuts and the flanges are not limited to such shapes, but they may have other axially asymmetric shapes. For example, their cross sections perpendicular to their respective axial directions may have polygonal profiles.

Figure 7:
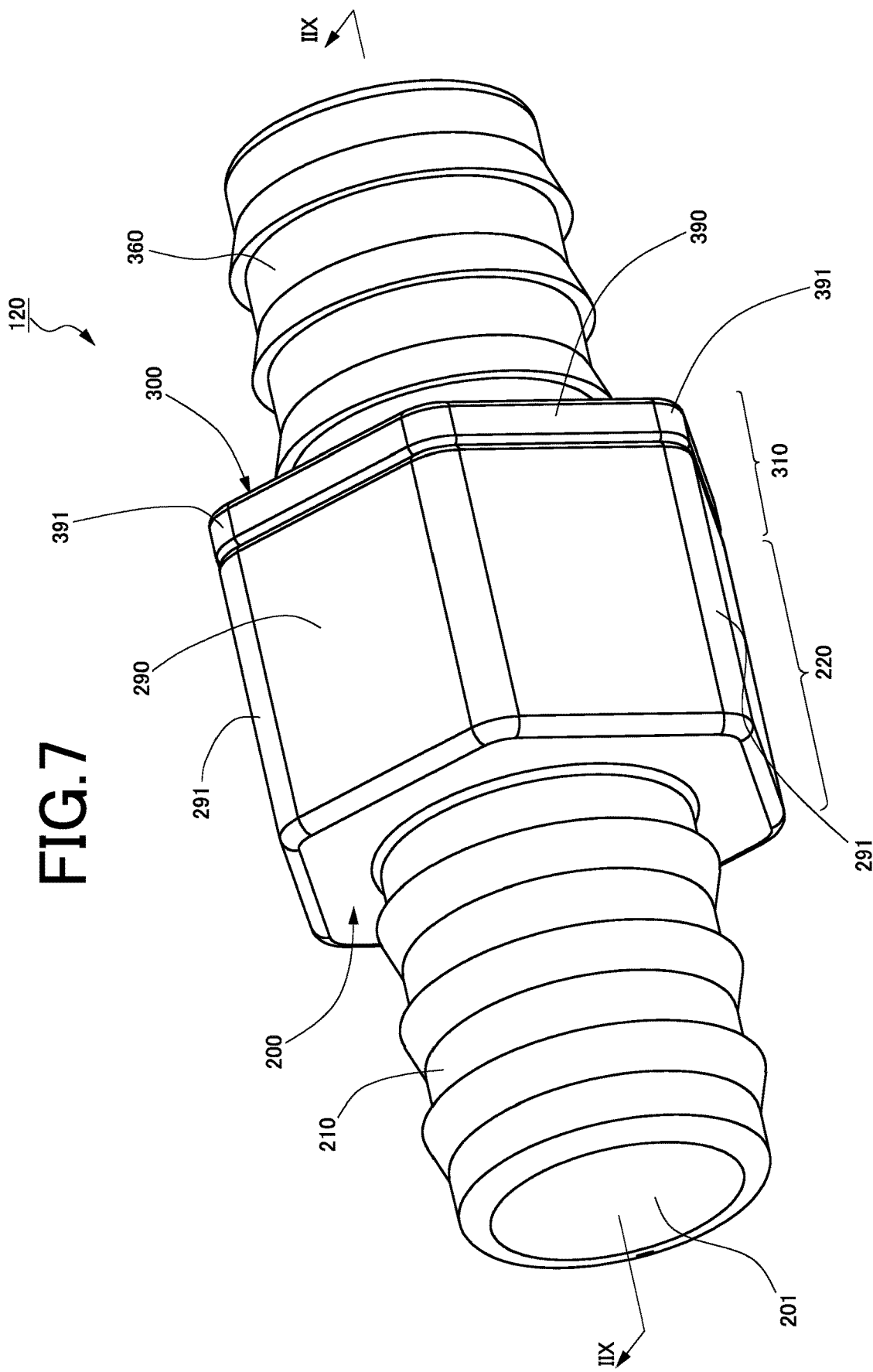
FIG. 7 is a perspective view showing an appearance of a modification of the tube fitting according to embodiment 1 of the invention.
Figure 8:
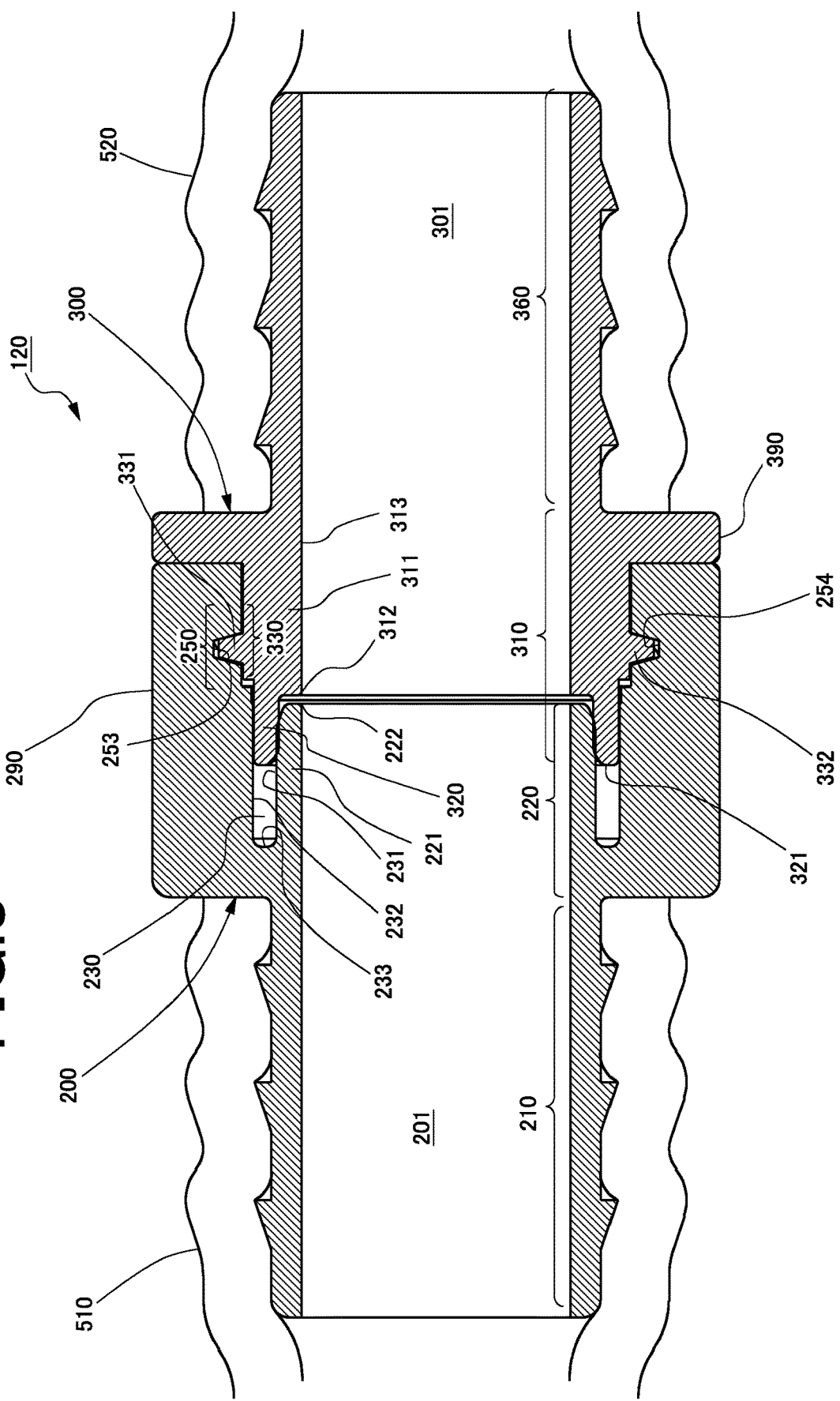
FIG. 8 is a cross-section view along a line IIX-IIX in FIG. 7.

FIG. 7 is a perspective view showing an appearance of a modification of the tube fitting 120 according to embodiment 1 of the invention. FIG. 8 is a cross-section view along a line IIX-IIX in FIG. 7. The tube fitting 120 differs from one 100 according to embodiment 1 in shapes of nut and flange. Other components are similar in structure to those of the tube fitting 100 according to embodiment 1. In FIGS. 7 and 8, components similar in structure to those shown in FIGS. 1 and 2 are marked by the same numbers as those shown in FIGS. 1 and 2. In addition, the following explains portions of the tube fitting 120 different in structure from those of the tube fitting 100 according to embodiment 1, and explanation about other portions can be found in description of embodiment 1.

The second axial end portion 220 of the fitting body 200 includes a nut 290, which is an annular portion coaxially surrounding the annular groove 230, and whose cross-section perpendicular to its axial direction has a substantially hexagonal profile. A distance between two opposite edges of the hexagonal profile is larger than the outer diameter of the first axial end portion 210. A portion of the inner periphery of the nut 290 forms a radially outward surface of the annular groove 230. In the axial direction of the fitting body 200 (the left-right direction in FIG. 8), the nut 290 extends beyond the position of the opening portion 222 of the inner cylinder 221 (to the right side thereof in FIG. 8). The portion of the nut 290 beyond the position of the opening portion 222 is provided with an internal thread 250, which is a double start thread, for example. Two thread ridges 253 and 254 spiral along an inner periphery of the nut 290.

The first axial end portion 310 of the sleeve 300 includes a flange 390, which is a ring-shaped portion of the inner cylinder 311 extending radially outward from a portion 313 thereof located on the side opposite to the opening portion 312 thereof in the axial direction of the sleeve 300 (on the right side thereof in FIG. 8). Cross sections of the flange 390 perpendicular to the axial direction have a substantially hexagonal profile. A distance between two opposite edges of the hexagonal profile is larger than the outer diameter of the second axial end portion 360.

Figure 9:
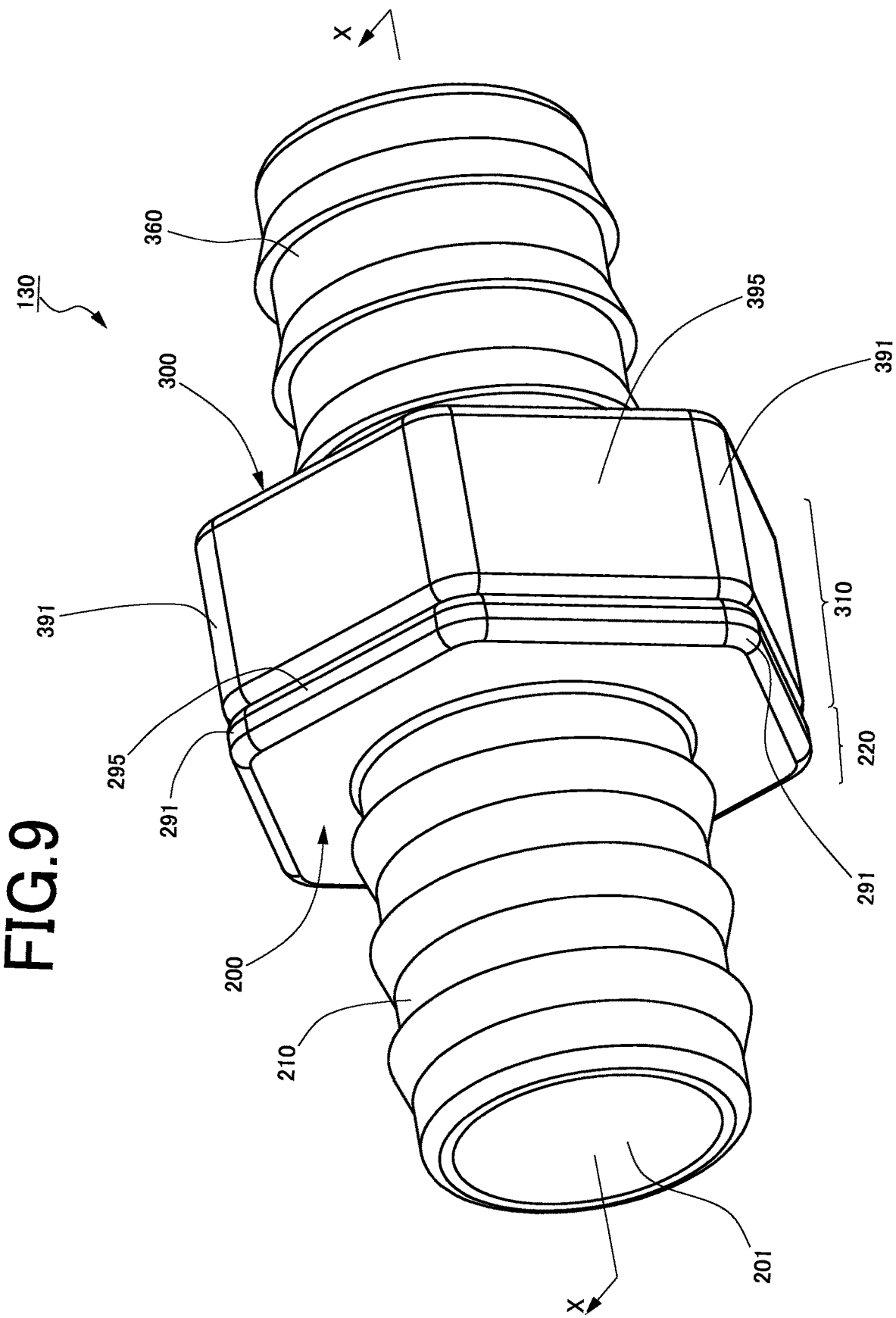
FIG. 9 is a perspective view showing an appearance of a modification of the tube fitting according to embodiment 2 of the invention.
Figure 10:
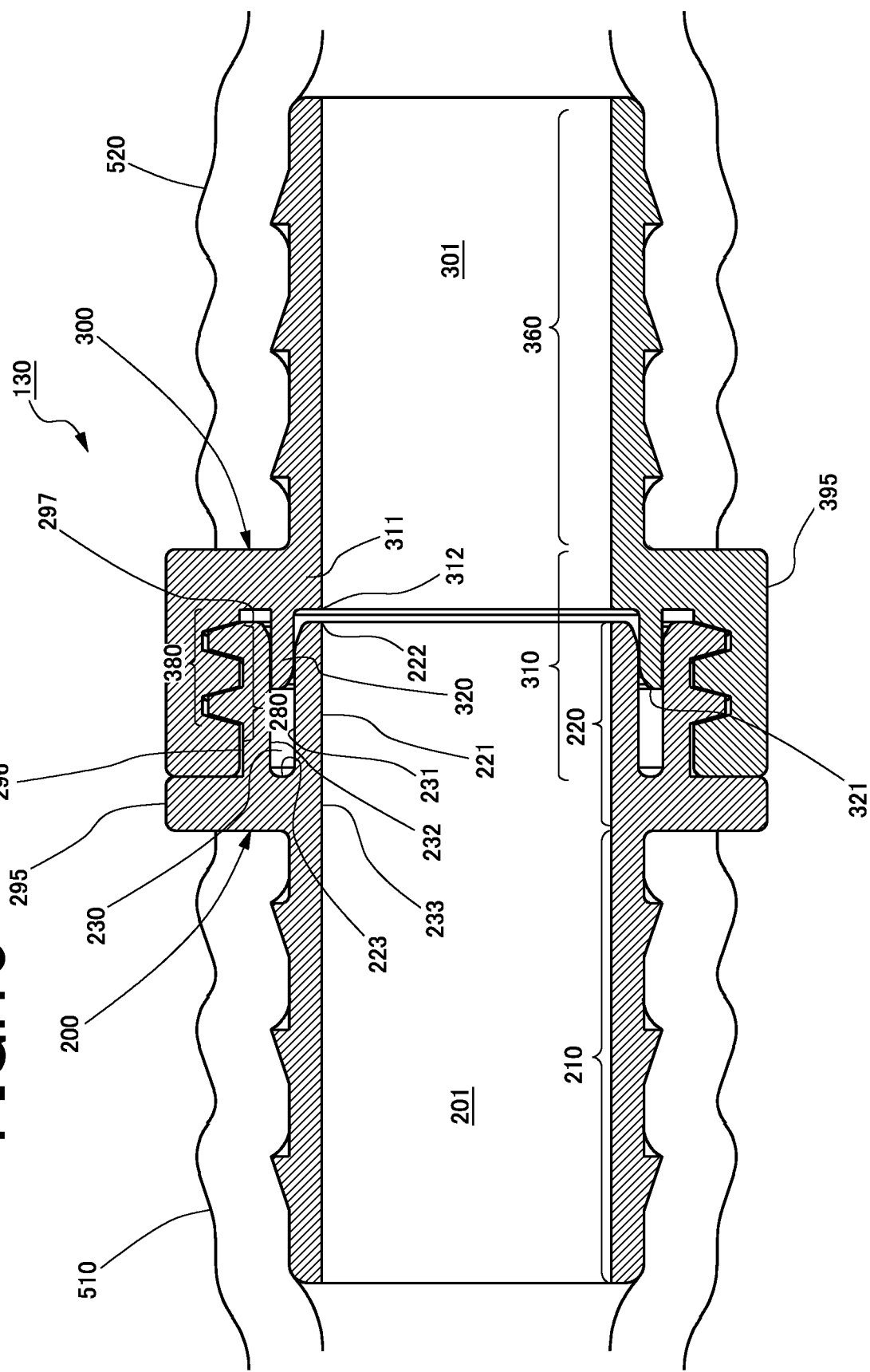
FIG. 10 is a cross-section view along a line X-X in FIG. 9.

FIG. 9 is a perspective view showing an appearance of a modification of the tube fitting 130 according to embodiment 2 of the invention. FIG. 10 is a cross-section view along a line X-X in FIG. 9. The tube fitting 130 differs from one 110 according to embodiment 2 in shapes of nut and flange. Other components are similar in structure to those of the tube fitting 110 according to embodiment 2. In FIGS. 9 and 10, components similar in structure to those shown in FIGS. 5 and 6 are marked by the same numbers as those shown in FIGS. 5 and 6. In addition, the following explains portions of the tube fitting 130 different in structure from those of the tube fitting 110 according to embodiment 2, and explanation about other portions can be found in description of embodiment 2.

The second axial end portion 220 of the fitting body 200 includes a flange 295, which is a ring-shaped portion of the inner cylinder 221 extending radially outward from a portion 223 thereof located on the side opposite to the opening portion 222 thereof in the axial direction of the fitting body 200 (on the left side thereof in FIG. 10). Cross sections of the flange 295 perpendicular to the axial direction have a substantially hexagonal profile. A distance between two opposite edges of the hexagonal profile is larger than the outer diameter of the first axial end portion 210. From the flange 295, an outer cylinder 296 protrudes toward the axial direction of the fitting body 200 (rightward in FIG. 10), whose cross sections perpendicular to the axial direction are of a substantially circular-ring shape, and whose axial tip 297 is located at the same axial position as the opening portion 222 of the inner cylinder 221. An inner periphery of the outer cylinder 296 forms a radially outward surface of the annular groove 230. On the other hand, an outer periphery of the outer cylinder 296 is provided with an external thread 280.

The first axial end portion 310 of the sleeve 300 includes a nut 395, which is an annular portion coaxially surrounding the inner cylinder 311 and the annular protrusion 320, and whose cross sections perpendicular to its axial direction have a substantially hexagonal profile. A distance between two opposite edges of the hexagonal profile is larger than the outer diameter of the second axial end portion 360. In the axial direction of the sleeve 300 (the left-right direction in FIG. 10), the nut 395 extends beyond the axial position of the tip 321 of the annular protrusion 320 (to the right side thereof in FIG. 10). The inner periphery of the nut 395 is provided with an internal thread 380 surrounding the annular protrusion 320.

Outer peripheries of the nut 290 and flange 390 of the modified tube fitting 120 according to embodiment 1 and the nut 295 and flange 395 of the modified tube fitting 130 according to embodiment 2 each have six corners 291 and 391. In the work of connecting the fitting body 200 with the sleeve 300, a worker can put his/her fingers on the corners 291 of the nut 290 and the corners 391 of the flange 390, or the corners 291 of the nut 295 and the corners 391 of the flange 395 to relatively rotate the fitting body 200 and the sleeve 300 around a common axis, and thus, the worker can easily exert circumferential force onto the fitting body 200 and the sleeve 300. In addition, change in rotation angle between the fitting body 200 and the sleeve 300 displaces the corners 291 and 391 of either the nut 290 and flange 390 or the nut 295 and flange 395 in a common circumferential direction. When a rotation angle between the external and internal threads reaches an engagement finish position, the corners 291 and 391 are located at the same circumferential positions, as shown in FIGS. 7 and 9. Accordingly, by seeing the corners 291 and 391 located at the same circumferential positions, the worker can visually identify engagement of the external and internal threads has been completed.

What is claimed is:
1. A tube fitting that connects a first tube with a second tube, comprising:
  a fitting body having a tubular shape whose first axial end portion includes a connector for the first tube, and whose second axial end portion includes an annular groove;
  a sleeve whose first axial end portion includes an annular protrusion and an external thread, and whose second axial end portion includes a connector for the second tube; and
  a nut including an internal thread to be engaged with the external thread, wherein:
  engagement of the external thread with the internal thread causes press-fit of the annular protrusion into the annular groove to form a seal region between the annular protrusion and the annular groove;
  under a condition that a depth of the annular groove is three or more times as large as a thickness of a radially inward or outward wall of the annular groove, an axial distance from the seal region to a bottom of the annular groove is designed to exceed ten times an increment width of the annular groove caused by the press-fit of the annular protrusion into the annular groove; and the nut is integrated as a single piece with the second axial end portion of the fitting body.

2. A tube fitting that connects a first tube with a second tube, comprising:

a fitting body having a tubular shape whose first axial end portion includes a connector for the first tube, and whose second axial end portion includes an annular groove and an external thread;

a sleeve whose first axial end portion includes an annular protrusion, and whose second axial end portion includes a connector for the second tube; and a nut including an internal thread to be engaged with the external thread, wherein:

engagement of the external thread with the internal thread causes press-fit of the annular protrusion into the annular groove to form a seal region between the annular protrusion and the annular groove;

under a condition that a depth of the annular groove is three or more times as large as a thickness of a radially inward or outward wall of the annular groove, an axial distance from the seal region to a bottom of the annular groove is designed to exceed ten times an increment width of the annular groove caused by the press-fit of the annular protrusion into the annular groove; and the nut is integrated as a single piece with the first axial end portion of the sleeve.

* * * * *